「12」 United States Patent
Kanamaru et al.

(10) Patent No.: US 6,782,853 B2
(45) Date of Patent: Aug. 31, 2004

(54) CONTROL APPARATUS AND METHOD FOR VALVE ACTUATING SYSTEM OF INTERNAL COMBUSTION ENGINE

(75) Inventors: Masanobu Kanamaru, Mishima (JP); Naohide Fuwa, Toyota (JP); Akira Eiraku, Susono (JP); Gohki Kinoshita, Susono (JP); Masashi Hakariya, Mishima (JP); Takahiro Yamanashi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/645,912

(22) Filed: Aug. 22, 2003

(65) Prior Publication Data

US 2004/0040524 A1 Mar. 4, 2004

(30) Foreign Application Priority Data

Aug. 30, 2002 (JP) ........................................ 2002-253999

(51) Int. Cl.$^7$ ................................................ F01L 1/34
(52) U.S. Cl. ................................ 123/90.15; 123/90.16; 123/90.17; 123/90.18; 123/90.39; 123/90.44
(58) Field of Search ......................... 123/90.15, 90.16, 123/90.17, 90.18, 90.27, 90.31, 90.39, 90.44; 464/1, 2, 160

(56) References Cited

U.S. PATENT DOCUMENTS

| 6,167,854 | B1 | * | 1/2001 | Regueiro | ................... | 123/90.17 |
| 6,330,869 | B1 | * | 12/2001 | Yoshiki et al. | ............ | 123/90.15 |
| 6,390,041 | B2 | * | 5/2002 | Nakamura et al. | ........ | 123/90.15 |
| 6,397,800 | B2 | * | 6/2002 | Nohara et al. | ............ | 123/90.15 |
| 6,401,675 | B1 | | 6/2002 | Nakamura et al. | | |
| 6,425,357 | B2 | * | 7/2002 | Shimizu et al. | ........... | 123/90.16 |

* cited by examiner

*Primary Examiner*—Thomas Denion
*Assistant Examiner*—Ching Chang
(74) *Attorney, Agent, or Firm*—Oliff & Berridge, PLC

(57) ABSTRACT

A control apparatus is provided for a valve actuating system which is operable to lift an intake valve or an exhaust valve of an internal combustion engine and includes a lift characteristic changing mechanism for changing a lift characteristic of the intake valve or the exhaust valve. The control apparatus calculates a target operation value of the lift characteristic changing mechanism, and calculates a realizable range of the operation value which can be realized by the lift characteristic changing mechanism, based on a controlled variable that can be given to the lift characteristic changing mechanism and at least one parameter related to an environment surrounding the lift characteristic changing mechanism. If the target operation value is not within the realizable range of the operation value, the control apparatus calculates a new target operation value to be within the realizable range.

14 Claims, 11 Drawing Sheets

CONTROL APPARATUS AND METHOD FOR VALVE ACTUATING SYSTEM OF INTERNAL COMBUSTION ENGINE

INCORPORATION BY REFERENCE

The disclosure of Japanese Patent Application No. 2002-253999 filed on Aug. 30, 2002, including the specification, drawings and abstract, is incorporated herein by reference in its entirety.

BACKGROUND OF THE INVENTION

1. Field of the Invention

The invention relates to control apparatus and method for a variable valve actuating system of an internal combustion engine.

2. Description of Related Art

For example, U.S. Pat. No. 6,401,675 B1 discloses a valve actuating system for lifting intake valves of an internal combustion engine, which system is provided with a lift characteristic changing mechanism for changing lift characteristics of the intake valves. The lift characteristic changing mechanism disclosed in the above-identified U.S. Patent is arranged to be driven by an electric motor.

In the valve actuating system as described above, characteristics or tendencies of changes in the lift characteristics of the intake valves effected by the lift characteristic changing mechanism change depending upon output characteristics of the electric motor, and the output characteristics of the electric motor change depending upon the environment surrounding the electric motor. For example, the output torque of the electric motor changes depending upon the temperature of the electric motor, more specifically, the output torque of the electric motor decreases as the temperature of the electric motor rises. Where the output torque of the electric motor is reduced, the lift characteristics of the intake valves may not be changed as desired even if the lift characteristic changing mechanism is driven by the electric motor.

The above-described problem occurs not only to the valve actuating system provided with the lift characteristic changing mechanism for changing the lift characteristics of the intake valves, but also to a valve actuating system for lifting exhaust valves of the engine, which system is provided with a lift characteristic changing mechanism for changing lift characteristics of the exhaust valves.

SUMMARY OF THE INVENTION

It is therefore an object of the invention to provide control apparatus and method for controlling a valve actuating system for changing lift characteristics of intake valves or exhaust valves of an internal combustion engine as desired.

To accomplish the above and/or other object(s), there is provided according to the invention a control apparatus for a valve actuating system which is operable to lift an intake valve or an exhaust valve of an internal combustion engine and includes a lift characteristic changing mechanism for changing a lift characteristic of the intake valve or the exhaust valve, comprising a controller that calculates a target operation value of the lift characteristic changing mechanism, calculates a realizable range of the operation value which can be realized by the lift characteristic changing mechanism, based on a controlled variable that can be given to the lift characteristic changing mechanism and at least one parameter related to an environment surrounding the lift characteristic changing mechanism, and calculates a new target operation value to be within the realizable range of the operation value when the target operation value is not within the realizable range of the operation value. Here, the lift characteristic changing mechanism may be in the form of a lift amount changing mechanism or a lift timing changing mechanism as described later.

When the target operation value of the lift characteristic changing mechanism is within the realizable range of the operation value, the control apparatus controls the lift characteristic changing mechanism according to the target operation value. When the target operation value of the lift characteristic changing mechanism is not within the realizable range of the operation value, on the other hand, the control apparatus determines a new target operation value within the realizable range, and controls the lift characteristic changing mechanism according to the new target operation value. Accordingly, the lift characteristic of the intake valve or the exhaust valve of the engine can be made equal to a target value.

BRIEF DESCRIPTION OF THE DRAWINGS

The foregoing and/or further objects, features and advantages of the invention will become more apparent from the following description of exemplary embodiments with reference to the accompanying drawings, in which like numerals are used to represent like elements and wherein.

DETAILED DESCRIPTION OF EXEMPLARY EMBODIMENTS

Figure 1:
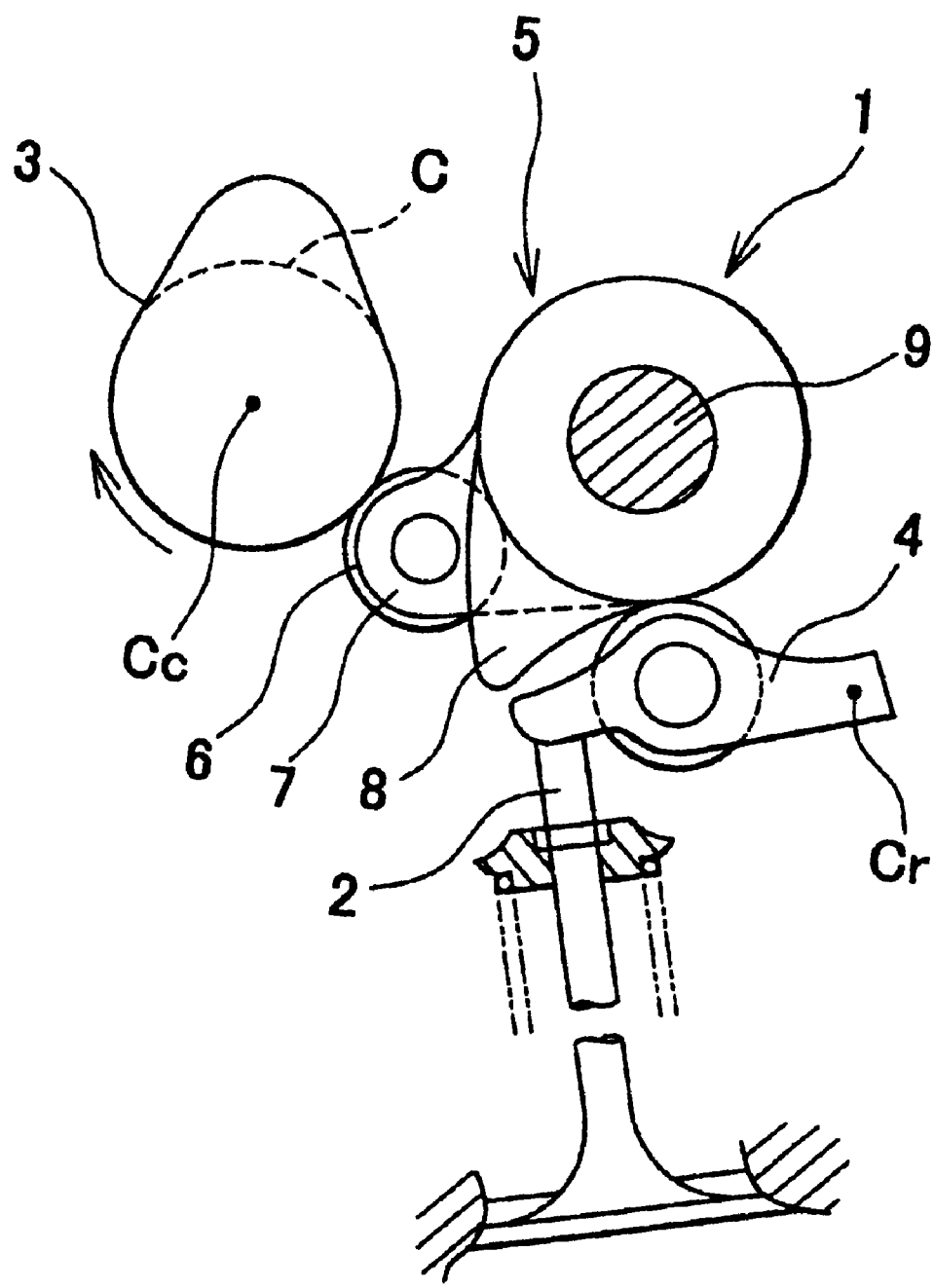
FIG. 1 is a view showing a lift amount changing mechanism of a valve actuating system to which control apparatus and method according to exemplary embodiments of the invention are applied.

Some exemplary embodiments of the invention will be described in detail with reference to the drawings. FIG. 1 shows a valve actuating system that employs control apparatus and method according to the invention. The valve actuating system 1 is installed in an internal combustion engine, such as a four-stroke diesel engine of compression, self-ignition type, and is operable to lift (i.e., open) intake valves 2. As shown in FIG. 1, the valve actuating system 1 includes a cam 3, a rocker arm 4, and a driving force transmitting mechanism 5 for transmitting driving force from the cam 3 to the rocker arm 4. The driving force transmitting mechanism 5 is disposed between the cam 3 and the rocker arm 4. The cam 3 is rotated about a center Cc (shown in FIG. 1) by the driving force of the engine. The rocker arm 4 abuts on an upper end of each of the intake valves 2, and is able to pivot about a pivot axis Cr by the driving force transmitted from the cam 3 via the driving force transmitting mechanism 5.

Figure 2:
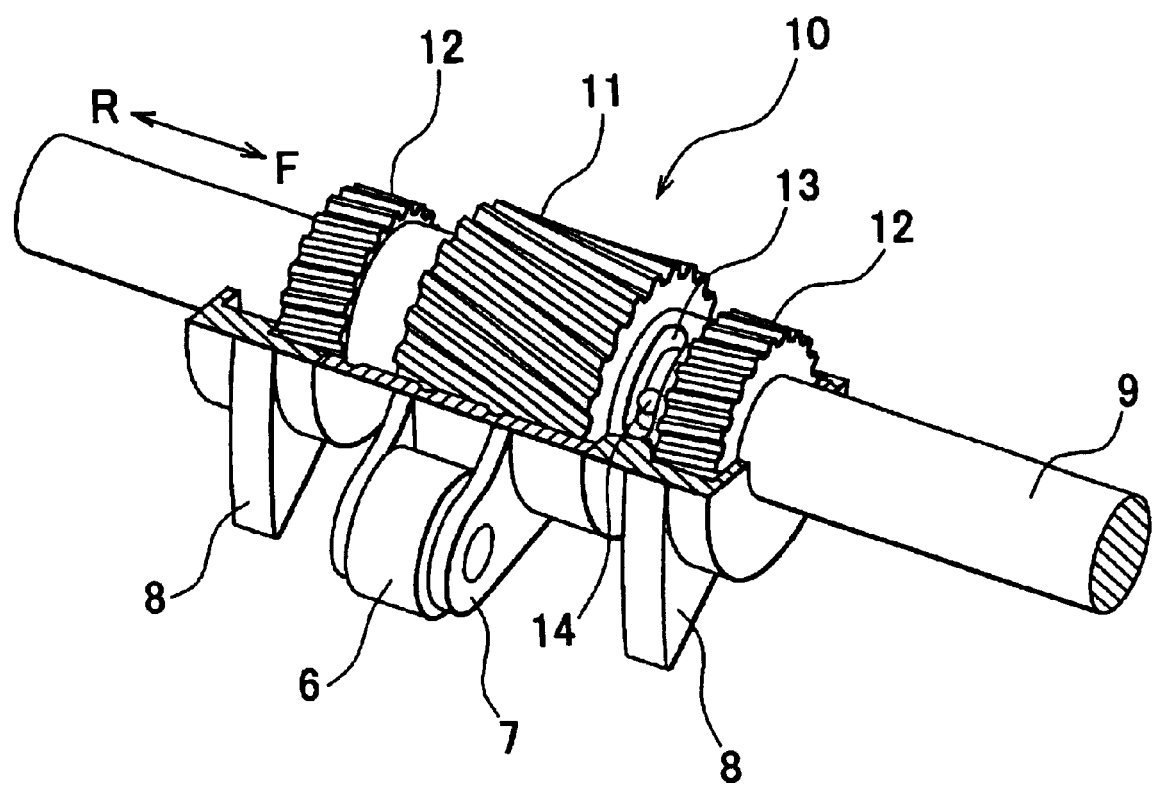
FIG. 2 is a perspective view showing a gear mechanism of the lift amount changing mechanism of FIG. 1.

Referring next to FIG. 2, the driving force transmitting mechanism 5 has an input arm 7 provided with a roller 6, and a pair of output arms 8. The input arm 7 and the output arms 8 are attached to a control shaft 9 such that these arms 7 and 8 are pivotally movable about the axis of the control shaft 9, independently of each other. The roller 6 rotatably attached to the input arm 7 abuts on the cam 3, while each of the output arms 8 abuts on the corresponding rocker arm 4.

A gear mechanism 10 is attached on the control shaft 9 such that the gear mechanism 10 is able to pivot or rotate about the axis of the control shaft 9. The gear mechanism 10 has a slot 13 that extends in the circumferential direction. Since a pin 14 that projects from the control shaft 9 engages with the slot 13, the gear mechanism 10 is not slidable in the axial direction on the control shaft 9, but is pivotable or rockable on the control shaft 9. The gear mechanism 10 connects the input arm 7 with the output arms 8. With this arrangement, the driving force the input arm 7 receives from the cam 3 is transmitted to the output arms 8 via the gear mechanism 10.

The gear mechanism 10 has a helical gear 11, and a pair of helical gears 12 disposed on the opposite sides of the helical gear 11. The middle helical gear (hereinafter called "middle gear") 11 meshes with a helical spline (not shown) formed helically on the inner circumferential surface of the input arm 7. Each of the opposite helical gears (hereinafter called "side gears") 12 meshes with a helical spline (not shown) formed helically on the inner circumferential surface of the corresponding output arm 8.

Figure 3A:
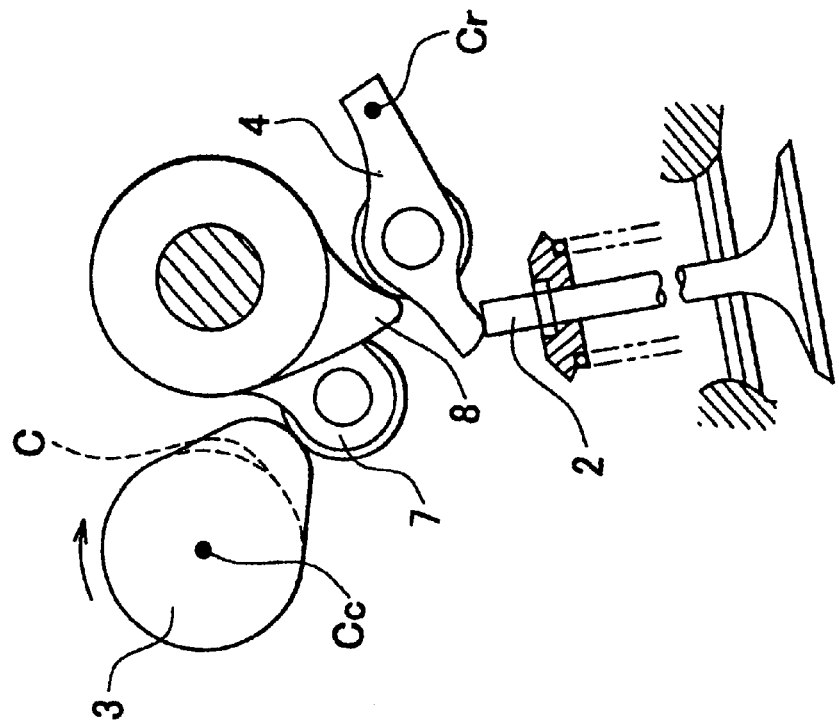
FIG. 3A and FIG. 3B are views showing the operations of the lift amount changing mechanism that provides the maximum lift amount.
Figure 3B:
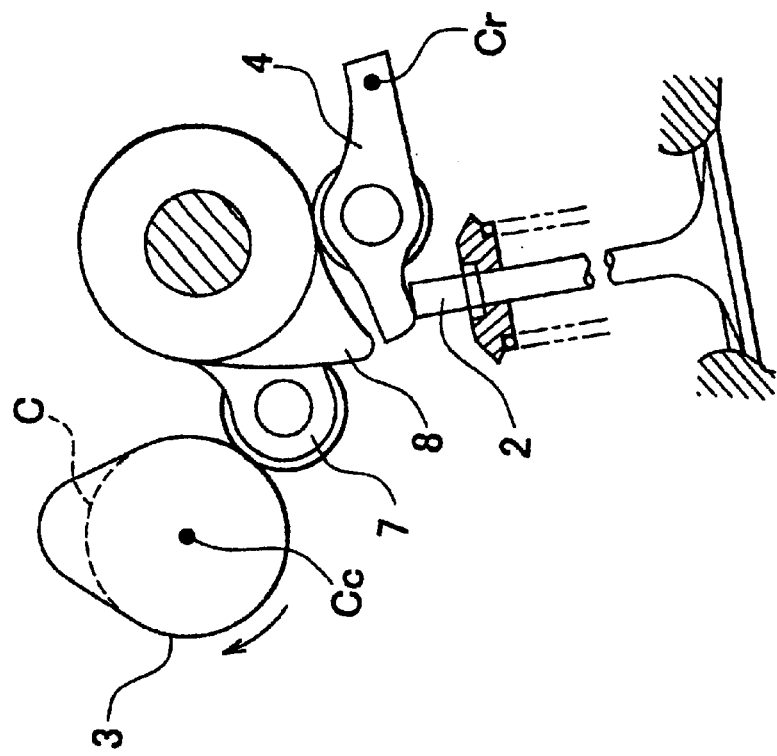

In operation, when the control shaft 9 causes the gear mechanism 10 to slide in direction R shown in FIG. 2 along the axis of the control shaft 9, the gear mechanism 10 moves in the direction R relative to the input arm 7 and the output arms 8. In this case, the input arm 7 and the output arms 8 are rotated in the opposite directions about the axis of the control shaft 9, due to the interaction of the helical gears 11, 12 of the gear mechanism 10 and the helical splines of the arms 7, 8, so as to increase an angle (hereinafter called "inter-arm angle") formed by the input arm 7 and the output arms 8 with respect to a center placed on the axis of the control shaft 9. FIG. 3A and FIG. 3B show the positional relationship between the input arm 7 and the output arms 8 (one of which is shown in the figures) established when the gear mechanism 10 is caused to slide to the limit in the direction R shown in FIG. 2, namely, when the inter-arm angle is maximized.

Figure 4A:
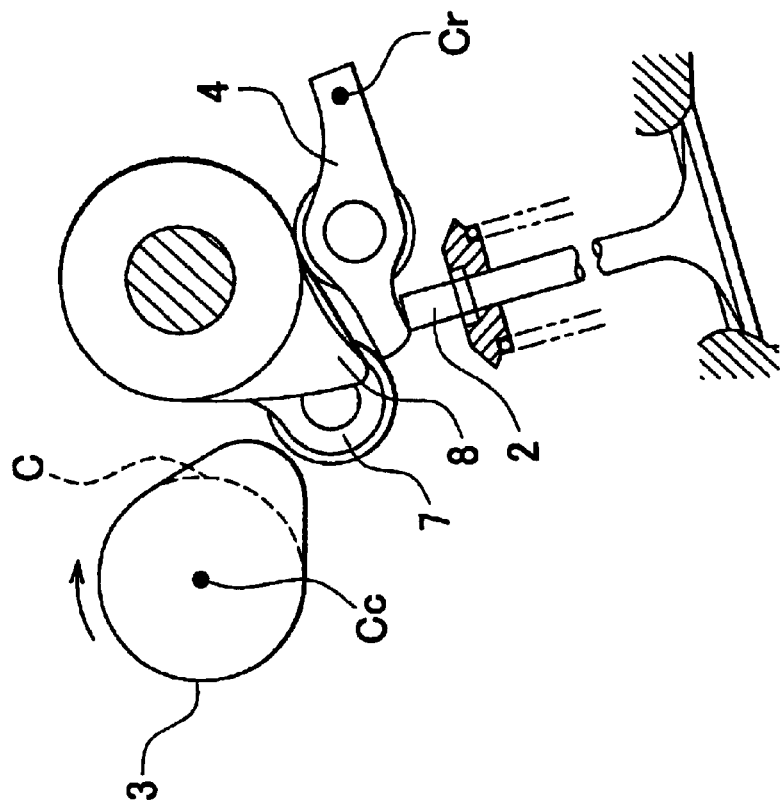
FIG. 4A and FIG. 4B are views showing the operations of the lift amount changing mechanism that provides the minimum lift amount.
Figure 4B:
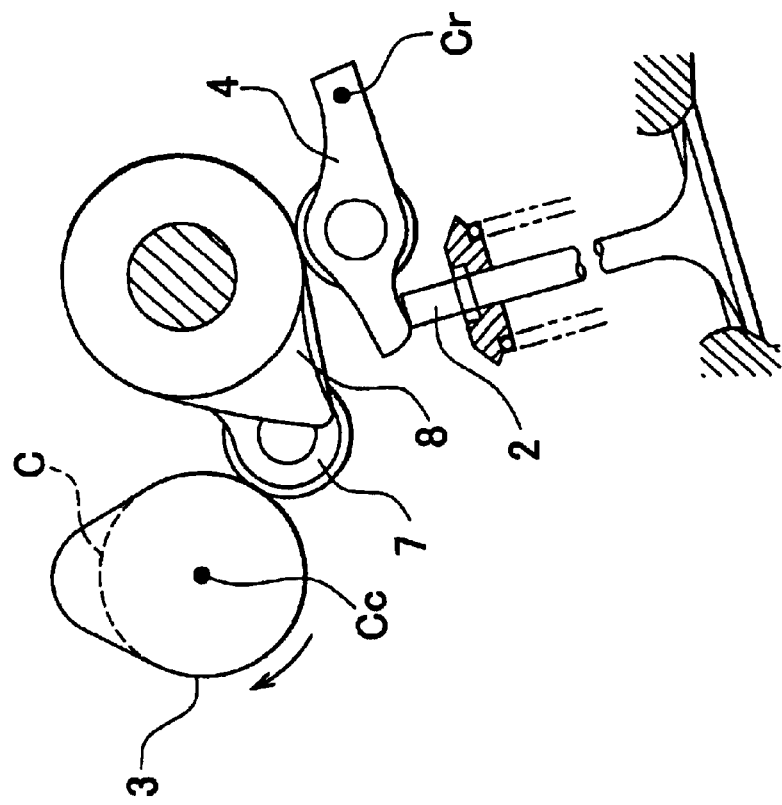

When the control shaft 9 causes the gear mechanism 10 to slide in direction F shown in FIG. 2, on the other hand, the gear mechanism 10 moves in the direction F relative to the input arm 7 and the output arms 8. In this case, the input arm 7 and the output arms 8 are rotated in the opposite directions about the axis of the control shaft 9, due to the interaction of the helical gears 11, 12 of the gear mechanism 10 and the helical splines of the arms 7, 8, so as to reduce an angle (inter-arm angle) formed by the input arm 7 and the output arms 8 with respect to the center placed on the axis of the control shaft 9. FIG. 4A and FIG. 4B show the positional relationship between the input arm 7 and the output arms 8 when the gear mechanism 10 is caused to slide to the limit in the direction F shown in FIG. 2, namely, when the inter-arm angle is minimized.

When the cam 3 is rotated in the clockwise direction while the roller 6 of the input arm 7 abuts on a base circle arcuate portion C of the cam 3, as shown in FIG. 3A, the cam 3 does not cause the input arm 7 to pivot or rock on the control shaft 9, and therefore the gear mechanism 10 and the output arms 8 do not rotate or pivot on the control shaft 9. As a result, each of the output arms 8 does not cause the rocker arm 4 to pivot about the pivot axis Cr, and therefore the corresponding intake valve 2 is not lifted (or opened).

On the other hand, when a projecting portion of the cam 3 comes into contact with the roller 6 of the input arm 7, as shown in FIG. 3B, the cam 3 causes the input arm 7 to pivot on the control shaft 9, and therefore the gear mechanism 10 and the output arms 8 are caused to rotate or pivot on the control shaft 9. As a result, each of the output arms 8 causes the rocker arm 4 to pivot about the pivot axis Cr, thereby to lift (or open) the corresponding intake valve 2.

In the example of FIG. 3A and FIG. 3B, the angle (inter-arm angle) formed by the input arm 7 and the output arm 8 with respect to the center placed on the axis of the control shaft 9 is maximized, and therefore the intake valve 2 is lifted with the maximum operating angle and the maximum lift amount. Namely, the intake valve 2 is lifted with the maximum valve open amount, and the maximum quantity of air (i.e., intake air) is drawn into the combustion chamber at this time.

In the example of FIG. 4A and FIG. 4B, while the base circle arcuate portion C of the cam 3 is in contact with the roller 6 of the input arm 7, as shown in FIG. 4A, the output arm 8 does not cause the rocker arm 4 to pivot about the pivot axis Cr, and therefore the intake valve 2 is not lifted. On the other hand, when the projecting portion of the cam 3 comes into contact with the roller 6 of the input arm 7, as shown in FIG. 4B, the cam 3 causes the input arm 7 to pivot on the control shaft 9, and therefore the output arm 8 is caused to pivot on the control shaft 9.

In the example of FIG. 4A and FIG. 4B, however, the angle (inter-arm angle) between the input arm 7 and the output arm 8 with respect to the center on the axis of the control shaft 9 is minimized, and therefore the output arm 8 does not cause the rocker arm 4 to pivot about the pivot axis Cr even when the output arm 8 pivots about the control shaft 9. In this case, therefore, the intake valve 2 is not lifted, and the working angle and lift amount of the intake valve 2 are made equal to zero.

Figure 5:
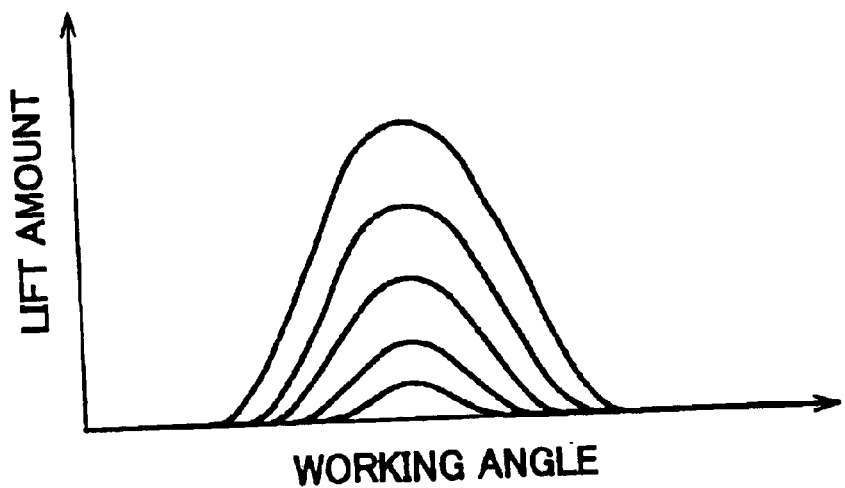
FIG. 5 is a graph showing curves that represent lifts of an intake valve.

In the valve actuating system as described above, the angle (inter-arm angle) formed by the input arm 7 and the output arms 8 with respect to the center on the axis of the control shaft 9 is continuously variable between the maximum angle and the minimum angle. Therefore, the working angle and maximum lift amount of the intake valve 2 are continuously variable, as shown in FIG. 5. Namely, the valve actuating system has a lift amount changing mechanism for changing the working angle and the maximum lift amount of the intake valve.

In the valve actuating system as described above, the maximum lift amount of the intake valve 2 increases as the working angle of the intake valve 2 increases. Also, the quantity of air (intake air) drawn into the combustion chamber has a tendency to increase as the working angle of the intake valve 2 increases. In the following description, "lift amount" means an amount that represents the working angle and maximum lift amount of the intake valve 2 and is indicative of the intake air quantity. In FIG. 5, the vertical axis indicates the working angle, and the horizontal axis indicates the lift amount.

In control of the valve actuating system as described above, the target value of the lift amount of the lift amount changing mechanism, the target value of the rate of change of the lift amount per unit time (which will be called "lift amount velocity"), and the target value of the rate of change of the lift amount velocity per unit time (which will be called "lift amount acceleration") are determined so that required characteristics of the internal combustion engine, such as the output torque of the engine, the fuel economy of the engine and the quality of exhaust emissions of the engine are optimized.

Figure 6:
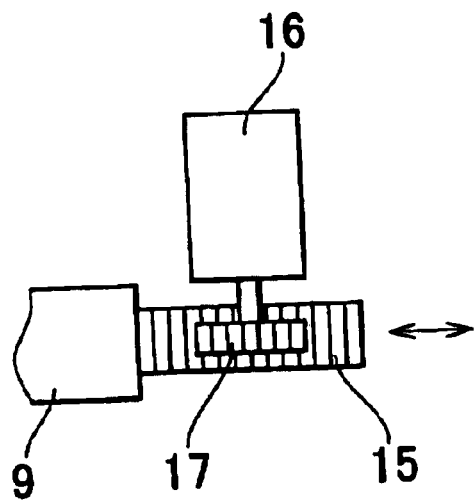
FIG. 6 is a view showing an electric motor for driving the lift amount changing mechanism.

In the meantime, the valve actuating system as described above is further provided with a rack 15 formed at an end portion of the control shaft 9, and a pinion 17 that is connected to an electric motor 16 and meshes with the rack 15, as shown in FIG. 6. In operation, the control shaft 9 is moved by the electric motor 16 in the direction of the axis of the control shaft 9, relative to the input arm 7 and the output arms 8. Namely, the lift amount changing mechanism is driven along the axis of the control shaft 9 by the electric motor 16.

Accordingly, the lift amount, lift amount velocity and the lift amount acceleration (hereinafter collectively called "operation values") that can be realized by the lift amount changing mechanism change depending upon the output characteristics of the electric motor 16, such as the output torque, stroke amount, velocity of rotation and acceleration of rotation of the electric motor 16. Also, the output characteristics of the electric motor 16 change depending upon the level of voltage (controlled variable) that can be applied from the power supply to the electric motor 16, and parameters related to the environment surrounding the electric motor 16. The parameters may include the temperature of the electric motor 16, the instantaneous position of the motor 16, the instantaneous velocity of rotation of the motor 16, the instantaneous acceleration of rotation of the motor 16, and the engine speed. Namely, the output characteristics of the electric motor 16 change depending upon various conditions related to the operation of the electric motor 16.

Accordingly, if the level of the voltage that can be applied to the electric motor 16 and the parameters related to the environment surrounding the electric motor 16 change, and the output characteristics of the motor 16 change according to the changes in the voltage and the parameters, operation ranges (i.e., ranges of the above-indicated operation values) that can be realized by the lift amount changing mechanism also change. Thus, in order to provide the optimum characteristics of the internal combustion engine, the target operation values of the lift amount changing mechanism should be determined in view of the changes in the operation ranges that can be realized by the lift amount changing mechanism.

Now, a control method according to the first embodiment of the invention will be described. In the first embodiment, target operation values (e.g., stroke amount, rotational velocity and rotational acceleration) of the electric motor 16, which optimize the required characteristics of the engine, are initially calculated as target operation values (e.g., lift amount, lift amount velocity and lift amount acceleration) of the lift amount changing mechanism, which optimize the required characteristics of the engine.

Next, the operation values that can be realized by the electric motor 16 are calculated as the operation values that can be realized by the lift amount changing mechanism, by using a physical model (that is expressed by mathematical expressions), based on the level of voltage (controlled variable) that can be applied to the electric motor 16, and the parameters (e.g., the temperature of the motor 16, the instantaneous position of the motor 16, the instantaneous rotational velocity of the motor 16, the instantaneous rotational acceleration of the motor 16, and the engine speed). Thus, the operation ranges that can be realized by the electric motor 16 are calculated. If the initially calculated target operation values of the electric motor 16 are within the realizable operation ranges, these target values are employed as they are as final target operation values of the electric motor 16.

If the initially calculated target operation values of the electric motor 16 are not within the realizable operation ranges, on the other hand, target operation values of the electric motor 16 are newly calculated to be within the realizable operation ranges of the motor 16, so that the required characteristics of the engine become as close to the optimum characteristics as possible, or so that the required characteristics of the engine to which priorities are assigned becomes as close to the respective optimum characteristics as possible in order of priority.

In other words, according to the present embodiment of the invention, the target operation values of the lift amount changing mechanism, which optimize the required characteristics of the engine, are calculated, and the realizable operation ranges of the lift amount changing mechanism are then calculated by using a physical model (represented by mathematical expressions), based on the controlled variable that can be given to the lift amount changing mechanism, and the parameters related to the environment surrounding the lift amount changing mechanism. If the initially calculated target operation values of the lift amount changing mechanism are within the realizable operation ranges, these target values are employed as they are as final target operation values of the lift amount changing mechanism.

If the initially calculated target operation values of the lift amount changing mechanism are not within the realizable operation ranges, on the other hand, target operation values of the lift amount changing mechanism are newly calculated to be within the realizable operation ranges of the lift amount changing mechanism, so that the required characteristics of the engine become as close to the optimum characteristics as possible, or so that the required characteristics of the engine to which priorities are assigned become as close to the optimum characteristics as possible in order of priority.

Thus, according to the first embodiment of the invention, the target operation values of the electric motor 16 are determined, taking account of the realizable operation ranges of the motor 16 obtained from the level of voltage (controlled variable) that can be applied to the motor 16 and the environment surrounding the motor 16, which influence the output characteristics of the electric motor 16. With this arrangement, even if the level of voltage (controlled variable) that can be applied to the electric motor 16 and/or the environment surrounding the motor 16 changes, the lift amount of the intake valve 2 can be changed as desired, and the required characteristics of the engine can be kept in the neighborhood of the optimum characteristics.

Namely, according to the first embodiment of the invention, the target operation values of the lift amount changing mechanism are determined, taking account of the realizable operation ranges of the lift amount changing mechanism obtained from the controlled variable that can be given to the lift amount changing mechanism and the environment surrounding the lift amount changing mechanism, which influence the output characteristics of the lift amount changing mechanism. With this arrangement, even if the controlled variable that can be given to the lift amount changing mechanism and/or the environment surrounding the lift amount changing mechanism changes, the lift amount of the intake valve 2 can be changed as desired, and the required characteristics of the engine can be kept in the neighborhood of the optimum characteristics.

Figure 7:
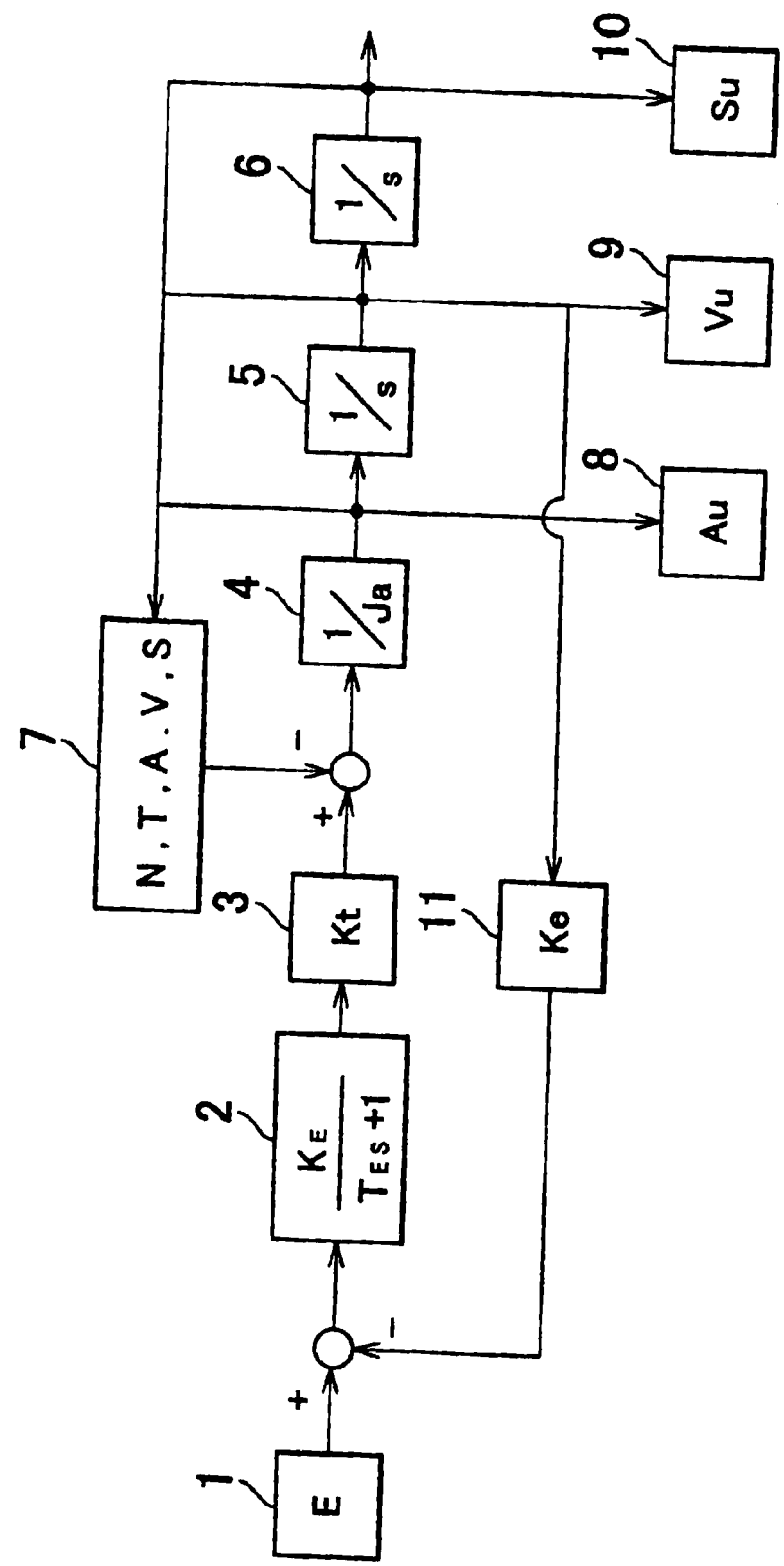
FIG. 7 is a view showing a model used for controlling the lift amount of the intake valve.

In the first embodiment, the realizable stroke amount, rotational velocity and rotational acceleration of the electric motor 16 are calculated by using a model as shown in FIG. 7, or using mathematical expressions derived from this model.

In FIG. 7, E is level of voltage applied from the power supply to the electric motor 16, $K_E$ is constant associated with the voltage, $T_E$ is motor inductance, $K_t$ is motor torque constant, $J_g$ is inertia, s is Laplace operator, N is engine speed, T is temperature of the electric motor 16, A is acceleration of the motor 16, Au is realizable rotational acceleration of the motor 16, V is rotational velocity of the motor 16, Vu is realizable rotational velocity of the motor 16, S is stroke amount of the motor 16, Pu is realizable stroke amount of the motor 16, and $K_e$ is motor induced voltage constant (counter electromotive force).

In the model of FIG. 7, a value obtained by subtracting a value as a product of the rotational velocity V of the electric motor 16 and the motor induced voltage constant $K_e$ (block 11) from the voltage level E (block 1) is multiplied by transfer function $K_E/(T_E s+1)$ in block 2, so that a value of current flowing in the electric motor 16 is calculated. The current value is then multiplied by the motor torque constant $K_t$ in block 3, so that the motor torque value is calculated. Then, a value obtained by subtracting torque of resistance to the electric motor 16 from the motor torque value is divided by the inertia $J_a$ in block 4, so that the rotational acceleration A of the motor 16 is calculated. Here, the torque of resistance is calculated based on the engine speed N, the temperature T of the electric motor 16, the rotational acceleration A of the motor 16, the rotational velocity V of the motor 16, and the stroke amount S of the motor 16. Then, the rotational acceleration A of the electric motor 16 is integrated in block 5, to provide the rotational velocity V of the motor 16. The rotational velocity V of the motor 16 is then integrated in block 6, to provide the stroke amount S of the motor 16.

If the maximum positive level of voltage that can be applied from the power supply to the electric motor 16 is input to the model of FIG. 7 as the voltage value E of block 1, the positive rotational acceleration, positive rotational velocity and the positive stroke amount, which can be realized by the electric motor 16, are obtained. From these values are obtained the positive acceleration of the lift amount, positive velocity of the lift amount, and the positive amount of change of the lift amount, which can be realized by the lift amount changing mechanism.

If the maximum negative level of voltage that can be applied from the power supply to the electric motor 16 is input to the model of FIG. 7 as the voltage value E of block 1, on the other hand, the negative rotational acceleration, negative rotational velocity and the negative stroke amount, which can be realized by the electric motor 16, are obtained. From these values are obtained the negative acceleration of the lift amount, negative velocity of the lift amount, and the negative amount of change of the lift amount, which can be realized by the lift amount changing mechanism.

Figure 8:
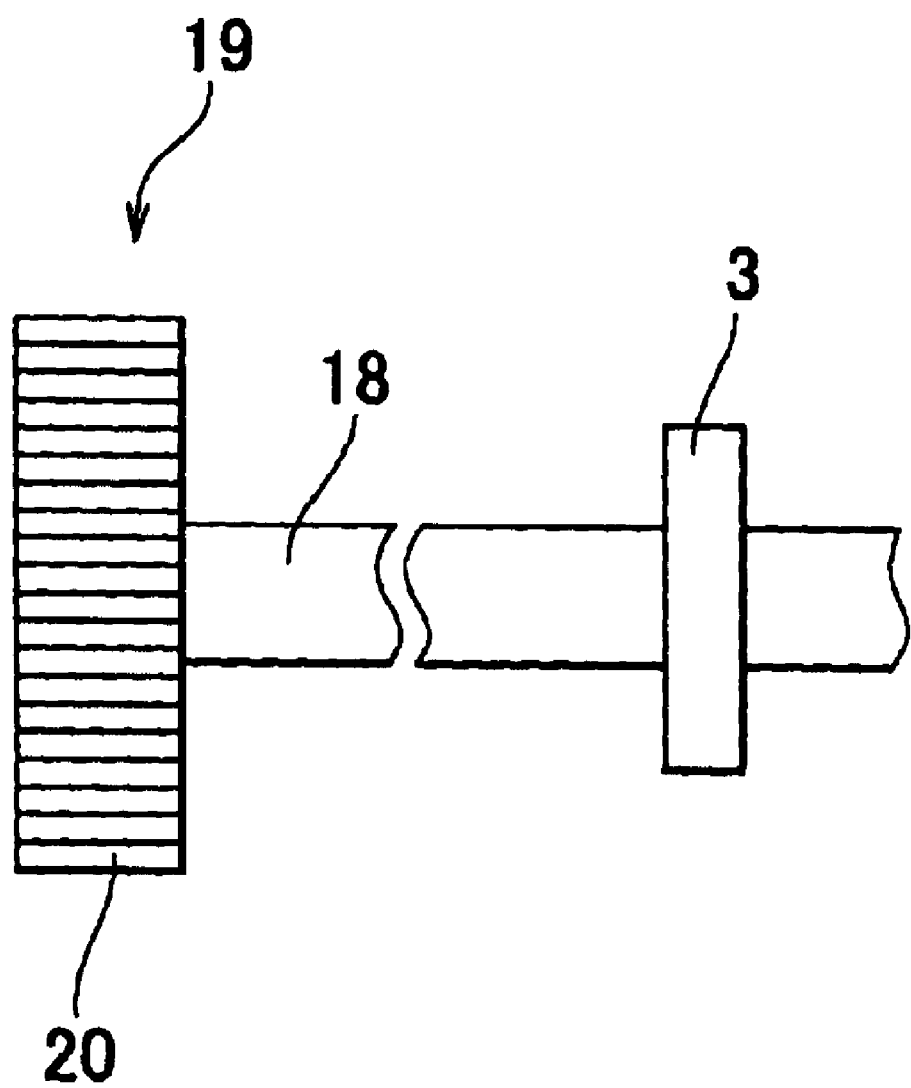
FIG. 8 is a view showing a lift timing changing mechanism of the valve actuating system of FIG. 1, to which a control method according to a second embodiment of the invention is applied.
Figure 9:
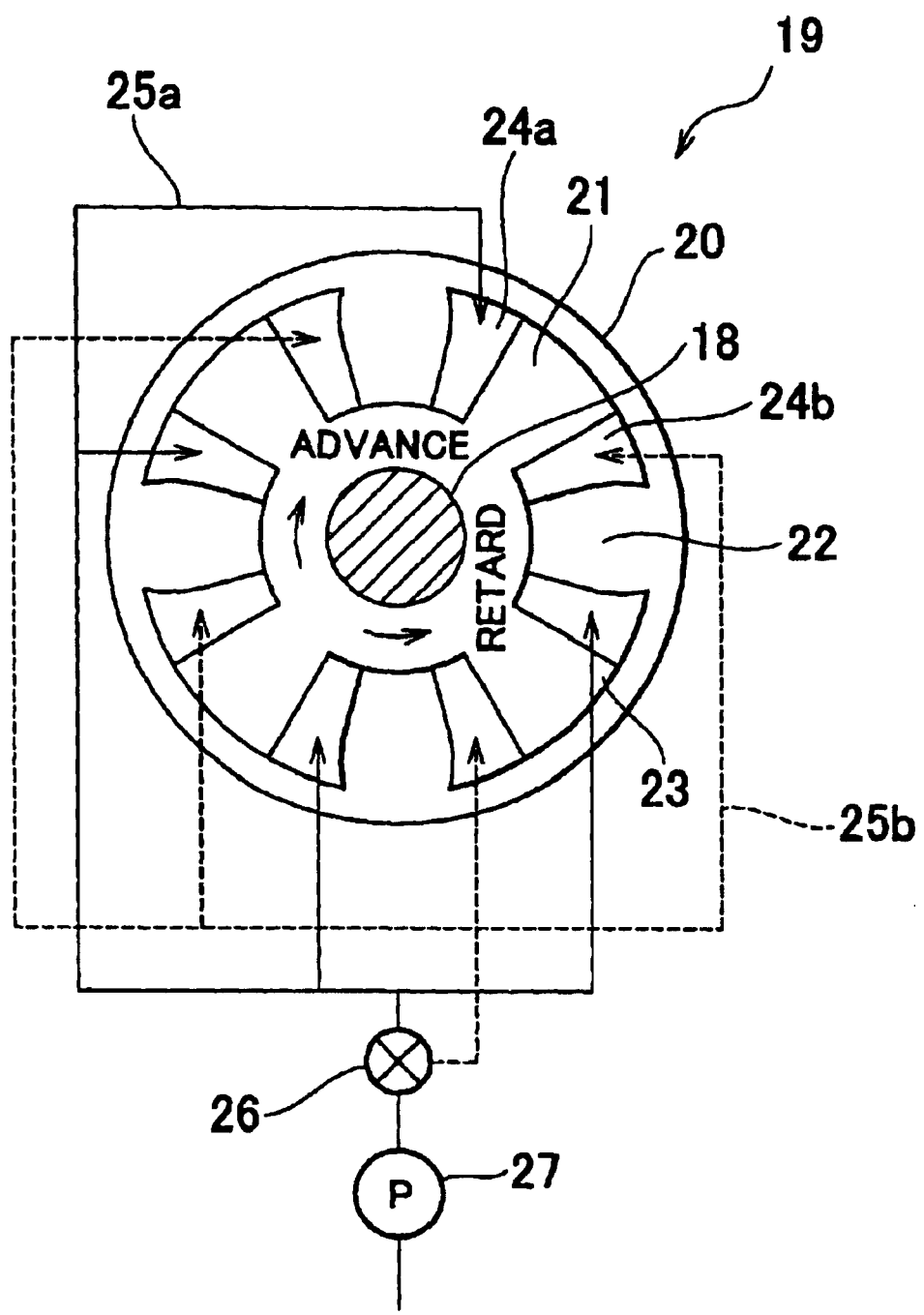
FIG. 9 is a view showing in detail the lift timing changing mechanism of FIG. 8.

In the valve actuating system as described above, a lift timing changing mechanism 19 is coupled to a camshaft 18 that supports and rotates the cam 3, as shown in FIG. 8. As shown in FIG. 9, the lift timing changing mechanism 19 has a housing 20 and a rotor 21. The housing 20 is rotated by the power of the internal combustion engine as driving force. The rotor 21 is housed in the housing 20, and is rotated in accordance with rotation of the housing 20. Also, the rotor 21 is mounted in the housing 20 such that it is rotatable relative to the housing 20. The camshaft 18 is connected to the rotor 21.

Four partition walls 22 protrude radially inwards from the inner circumferential surface of the housing 20. On the other hand, four partition walls 23 protrude radially outwards from the outer circumferential surface of the rotor 21. The respective partition walls 23 of the rotor 21 are disposed between the corresponding partition walls 22 of the housing 20. Thus, hydraulic chambers 24a, 24b are formed between the partition walls 23 of the rotor 21 and the partition walls 22 of the housing 20.

Oil paths 25a represented by solid lines in FIG. 9 are connected to the respective hydraulic chambers 24a formed on one side of the partition walls 23 of the rotor 21, and oil paths 25b represented by broken lines in FIG. 9 are connected to the respective hydraulic chambers 24b formed on the other side of the partition walls 23 of the rotor 21. These oil paths 25a, 25b are connected to a hydraulic pump 27 via an oil control valve (hereinafter called "OC valve") 26. The hydraulic pump 27 is driven by the power of the engine as driving force. The OC valve 26 is adapted to control the proportion of the amount of oil flowing into the oil paths 25a indicated by the solid lines in FIG. 9 and the amount of oil flowing into the oil paths 25b indicated by the broken lines in FIG. 9.

If the proportion of the amount of oil flowing into the oil paths 25a indicated by the solid lines in FIG. 9 is increased by the OC valve 26, the hydraulic oil is caused to flow into the hydraulic chambers 24a formed on one side of the partition walls 23 of the rotor 21. In this case, the rotor 21 is rotated by the hydraulic oil so that the lift timing of the intake valves 2 is advanced. Namely, the lift timing changing mechanism 19 operates to advance the phase of the lift stroke of the intake valves 2 relative to the stroke (piston stroke) of the piston that reciprocates in the cylinder of the engine.

If the proportion of the amount of oil flowing into the oil paths 25b indicated by the broken lines in FIG. 9 is increased by the OC valve 26, on the other hand, the hydraulic oil is caused to flow into the hydraulic chambers 24b formed on the other side of the partition walls 23 of the rotor 21. In this case, the rotor 21 is rotated by the hydraulic oil so that the lift timing of the intake valves 2 is retarded. Namely, the lift timing changing mechanism 19 operates to retard the phase of the lift stroke of the intake valves 2 relative to the stroke (piston stroke) of the piston that reciprocates in the cylinder of the engine.

In control of the valve actuating system as described above, the target value of the lift timing of the lift timing changing mechanism 19, the target value of the rate of change of the lift timing per unit time while the lift timing is being changed (which will be called "lift timing velocity), and the target value of the rate of change of the lift timing velocity per unit time (which will be called "lift timing acceleration") are determined so that the required characteristics of the internal combustion engine, such as the output torque of the engine, the fuel economy of the engine, and the quality of exhaust emissions of the engine, are optimized.

In the valve actuating system constructed as described above, the lift timing changing mechanism 19 is driven by the hydraulic pump 27. Accordingly, the lift timing, lift timing velocity and lift timing acceleration (hereinafter collectively called "operation values") that can be realized by the lift timing changing mechanism 19 change depending upon the output characteristics of the hydraulic pump 27, such as the level of the hydraulic pressure generated by the hydraulic pump 27, the rate of change of the hydraulic pressure (which will be called "hydraulic pressure velocity"), and the rate of change of the hydraulic pressure velocity (which will be called "hydraulic pressure acceleration"). Also, the output characteristics of the hydraulic pump 27 change depending upon the driving force (controlled variable) that can be applied to the hydraulic pump 27 for driving the hydraulic pump 27, and parameters related to the environment surrounding the hydraulic pump 27. These parameters may include the temperature of the hydraulic pump 27 (or the temperature of the hydraulic oil), the instantaneous velocity of the hydraulic pressure of the hydraulic pump 27, the instantaneous acceleration of the hydraulic pressure of the hydraulic pump 27, and the engine speed. Namely, the output characteristics of the hydraulic pump 27 change depending upon various conditions associated with the operation of the hydraulic pump 27.

Accordingly, if the driving force that can be applied to the hydraulic pump 27 and/or the parameters related to the environment surrounding the hydraulic pump 27 change(s), and the output characteristics of the hydraulic pump 27 change accordingly, operation ranges (i.e., ranges of the operation values) that can be realized by the lift timing changing mechanism 19 also change. In order to optimize the required characteristics of the internal combustion engine, the target operation values of the lift timing changing mechanism 19 should be determined in view of changes in the operation ranges that can be realized by the lift timing changing mechanism 19.

Now, a control method according to a second embodiment of the invention will be described. In the second embodiment, target operation values of the hydraulic pump 27 that optimize the required characteristics of the internal combustion engine are initially calculated as target operation values of the lift timing changing mechanism 19 that optimize the required characteristics of the engine.

Subsequently, realizable operation values of the hydraulic pump 27 are calculated as realizable operation values of the lift timing changing mechanism 19, by using a physical model (represented by mathematical expressions), based on the driving force (controlled variable) that can be applied to the hydraulic pump 27 and the parameters related to the environment surrounding the hydraulic pump 27. Thus, realizable operation ranges of the hydraulic pump 27 are calculated. If the initially calculated target operation values of the hydraulic pump 27 are within the realizable operation ranges, these target values are employed as they are as final target operation values of the hydraulic pump 27.

If the initially calculated target operation values of the hydraulic pump 27 are not within the realizable operation ranges, on the other hand, target operation values of the hydraulic pump 27 are newly calculated to be within the realizable operation ranges of the hydraulic pump 27, so that the required characteristics of the engine become as close to the optimum characteristics as possible, or so that the required characteristics of the engine to which priorities are assigned become as close to the optimum characteristics as possible in order of priority.

In other words, target operation values of the lift timing changing mechanism 19 that provide the optimum characteristics of the engine are initially calculated. Then, realizable operation ranges of the lift timing changing mechanism 19 are calculated, using a physical model (represented by mathematical expressions), based on the controlled variable that can be given to the lift timing changing mechanism 19 and the parameters related to the environment surrounding the lift timing changing mechanism 19. If the initially calculated target operation values of the lift timing changing mechanism 19 are within the realizable operation ranges, these target values are employed as they are as final target operation values of the lift timing changing mechanism 19.

If the initially calculated target operation values of the lift timing changing mechanism 19 are not within the realizable operation ranges, on the other hand, target operation values of the lift timing changing mechanism 19 are newly calculated to be within the realizable operation ranges of the lift timing changing mechanism 19, so that the required characteristics of the engine become as close to the optimum characteristics as possible, or so that the required characteristics of the engine to which priorities are assigned become as close to the optimum characteristics as possible in order of priority.

Thus, according to the second embodiment of the invention, the target operation values of the hydraulic pump 27 are determined, taking account of the realizable operation ranges of the hydraulic pump 27 obtained from the driving force (controlled variable) that can be applied to the hydraulic pump 27 and the environment surrounding the hydraulic pump 27, which influence the output characteristics of the hydraulic pump 27. With this arrangement, even if the driving force (controlled variable) that can be applied to the hydraulic pump 27 or the environment surrounding the hydraulic pump 27 changes, the lift timing of the intake valves 2 is changed as desired, and consequently the required characteristics of the internal combustion engine can be kept in the neighborhood of the optimum characteristics.

Namely, according to the second embodiment of the invention, the target operation values of the lift timing changing mechanism are determined, taking account of the realizable operation ranges of the lift timing changing mechanism obtained from the controlled variable that can be given to the lift timing changing mechanism and the environment surrounding the lift timing changing mechanism, which influence the operating characteristics of the lift timing changing mechanism. With this arrangement, even if the controlled variable that can be given to the lift timing changing mechanism and/or the environment surrounding the lift timing changing mechanism change(s), the lift timing of the intake valves 2 is changed as desired, and consequently the required characteristics of the engine can be kept in the vicinity of the optimum characteristics.

As described above, in the case where the valve actuating system 1 is provided with the lift amount changing mechanism and the lift timing changing mechanism 19, changes in the output characteristics of the electric motor 16 resulting from changes in the level of voltage that can be applied to the motor 16 and/or the environment surrounding the motor 16 are different or distinct from changes in the output characteristics of the hydraulic pump 27 resulting from changes in the driving force that can be applied to the hydraulic pump 27 and/or the environment surrounding the hydraulic pump 27. Accordingly, in order to maintain the optimum characteristics of the internal combustion engine, the target operation values of the lift amount changing mechanism and the lift timing changing mechanism 19 should be determined in view of differences between the changes in the output characteristics of the electric motor 16 and the changes in the output characteristics of the hydraulic pump 27.

Now, a control method according to a third embodiment of the invention will be described. In the third embodiment, target operation values of the electric motor 16 and target operation values of the hydraulic pump 27, which optimize the required characteristics of the internal combustion engine, are initially calculated as target operation values of the lift amount changing mechanism and target operation values of the lift timing changing mechanism 19, which optimize the required characteristics of the engine.

Subsequently, realizable operation values of the electric motor 16 are calculated as realizable operation values of the lift amount changing mechanism, using a physical model (represented by mathematical expressions), based on the level of voltage (controlled variable) that can be applied to the electric motor 16 and the parameters related to the environment surrounding the electric motor 16, so that realizable operation ranges of the electric motor 16 are calculated. In addition, realizable operation values of the hydraulic pump 27 are calculated as realizable operation values of the lift timing changing mechanism 19, using a physical model (represented by mathematical expressions), based on the driving force (controlled variable) that can be applied to the hydraulic pump 27 and the parameters related to the environment surrounding the hydraulic pump 27.

If the initially calculated target operation values of the electric motor 16 and the hydraulic pump 27 are within the respective realizable operation ranges, these target operation values are employed as they are as final target operation values of the electric motor 16 and the hydraulic pump 27. Thus, the initially calculated target values are employed as they are as final target operation values of the lift amount changing mechanism and the lift timing changing mechanism 19.

If the initially calculated target operation values of one of the electric motor 16 and the hydraulic pump 27 are not within the corresponding realizable operation ranges, on the other hand, the target operation values of the electric motor 16 are changed so as to approach the realizable operation values, and target operation values of the hydraulic pump 27 are newly calculated to be within the realizable operation ranges of the hydraulic pump 27, based on the thus changed target operation values of the electric motor 16, so that the required characteristics of the engine become as close to the optimum characteristics as possible, or so that the required characteristics of the engine to which priorities are assigned become as close to the optimum characteristics as possible in order of priority.

Needless to say, in the third embodiment, if the initially calculated target operation values of one of the electric motor 16 and the hydraulic pump 27 are not within the corresponding realizable operation ranges, the target operation values of the hydraulic pump 27 may be changed so as to approach the realizable operation values, and target operation values of the electric motor 16 may be newly calculated to be within the realizable operation ranges of the electric motor 16, based on the thus changed target operation values of the hydraulic pump 27, so that the required characteristics of the engine become as close to the optimum characteristics as possible, or so that the required characteristics of the engine to which priorities are assigned become as close to the optimum characteristics as possible in order of priority.

Also, if the initially calculated target operation values of one of the electric motor 16 and the hydraulic pump 27 are not within the corresponding realizable operation ranges, the target operation values of the electric motor 16 and the hydraulic pump 27 may be calculated to be realizable operation values within the realizable operation ranges of the electric motor 16 and the hydraulic pump 27.

According to the third embodiment, the lift amount and/or lift timing of the intake valves 2 is/are changed as desired, and consequently the required characteristics of the engine are maintained in the neighborhood of the optimum characteristics, as in the first and second embodiments.

Figure 10A:
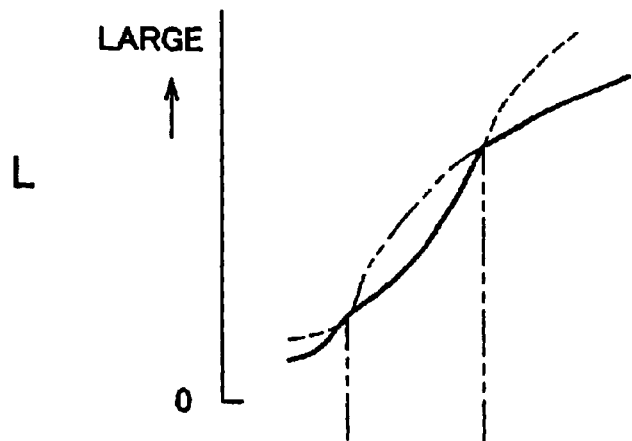
FIG. 10A through FIG. 10C are views showing one example of the progression of the lift amount, lift timing and the output torque over time while the lift amount and the lift timing are controlled according to a third embodiment of the invention.
Figure 10B:
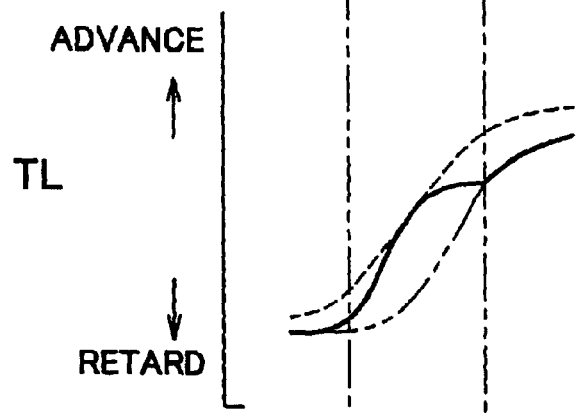
Figure 10C:
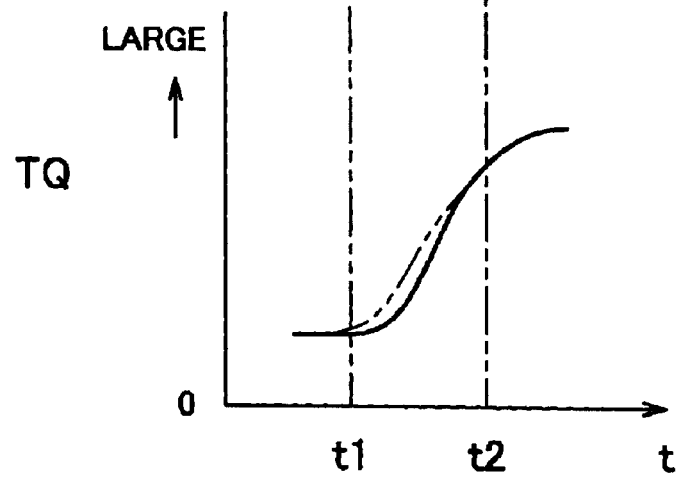

FIG. 10A through FIG. 10C show the progression of the lift amount of the intake valve 2, the lift timing of the intake valve 2 and the output torque of the engine, which are measured while the lift amount changing mechanism and the lift timing changing mechanism 19 are controlled according to the third embodiment, in the case where the output torque of the engine is employed as a typical example of the required characteristics of the engine.

More specifically, FIG. 10A indicates the lift amount L of the intake valve 2, and FIG. 10B indicates the lift timing TL of the intake valve 2, while FIG. 10C indicates the output torque TQ of the engine. In FIG. 10A, the one-dot chain line indicates the progression of the target value of the lift amount L with which the output torque required of the engine (hereinafter simply referred to as "required torque") can be achieved, and the broken line indicates the progression of the lift amount L that can be realized by the lift amount changing mechanism. In FIG. 10B, the one-dot chain line indicates the progression of the target value of the lift timing TL with which the required torque can be achieved, and the broken line indicates the progression of the lift timing TL that can be achieved by the lift timing changing mechanism 19. In FIG. 10C, the one-dot chain line indicates the progression of the required torque TQ. In FIG. 10B, "ADVANCE" means advance of the lift timing TL, and "RETARD" means retard of the lift timing TL. In FIGS. 10A–10C, the horizontal axis indicates time t.

In the example of FIG. 10A through FIG. 10C, up to time t1, the target value (on the one-dot chain line in FIG. 10A) of the lift amount L that achieves the required torque and the target value (on the one-dot chain line in FIG. 10B) of the lift timing TL that achieves the required torque are within the realizable operation ranges (defined by the broken lines) of the lift amount changing mechanism and the lift timing changing mechanism 19, respectively. Accordingly, up to time t1, the target values on the one-dot chain lines are employed as they are as final target values of the lift amount L and the lift timing TL. Namely, up to time t1, the lift amount L and the lift timing TL vary along the one-dot chain lines, as indicated by the solid lines in FIG. 10A and FIG. 10B, and the output torque TQ of the engine also varies along the one-dot chain line, as indicated by the solid line in FIG. 10C.

Between time t1 and time t2 in the example of FIG. 10A through FIG. 10C, on the other hand, the target value (on the one-dot chain line) of the lift amount L that achieves the required torque is not within the realizable operation range (defined by the broken line) of the lift amount changing mechanism, and the target value (on the one-dot chain line) of the lift timing TL that achieves the required torque is within the realizable operation range (defined by the broken line) of the lift timing changing mechanism 19. Accordingly, between time t1 and time t2, the realizable lift amount L of the lift amount changing mechanism on the broken line is employed as a new target value, and a target value of the lift timing TL is newly calculated to be within the realizable operation range (defined by the broken line in FIG. 10B), based on the new target value of the lift amount L, so that the output torque TQ of the engine becomes as close to the required torque as possible. Namely, between t1 and t2, the lift amount L varies along the broken line representing the realizable operation value of the lift amount changing mechanism, as indicated by the solid line in FIG. 10A, and the lift timing TL varies toward the broken line representing the realizable operation value of the lift timing changing mechanism 19, as indicated by the solid line in FIG. 10B, while the output torque TQ of the engine varies in the neighborhood of the one-dot chain line that represents the required torque, as indicated by the solid line in FIG. 10C.

After time t2 in the example of FIG. 10A through FIG. 10C, the target value (on the one-dot chain line in FIG. 10A) of the lift amount L that achieves the required torque and the target value (on the one-dot chain line in FIG. 10B) of the lift timing TL that achieves the required torque are within the respective realizable operation ranges (defined by the broken lines in FIGS. 10A and 10B) of the lift amount changing mechanism and the lift timing changing mechanism 19. Accordingly, after time t2, the target values on the one-dot chain lines are employed as they are as final target values of the lift amount L and the lift timing TL. Namely, after time t2, the lift amount L and the lift timing TL vary along the one-dot chain lines, as indicated by the solid lines in FIGS. 10A and 10B, respectively, and the output torque TQ of the engine also varies along the one-dot chain line in FIG. 10C.

Figure 11:
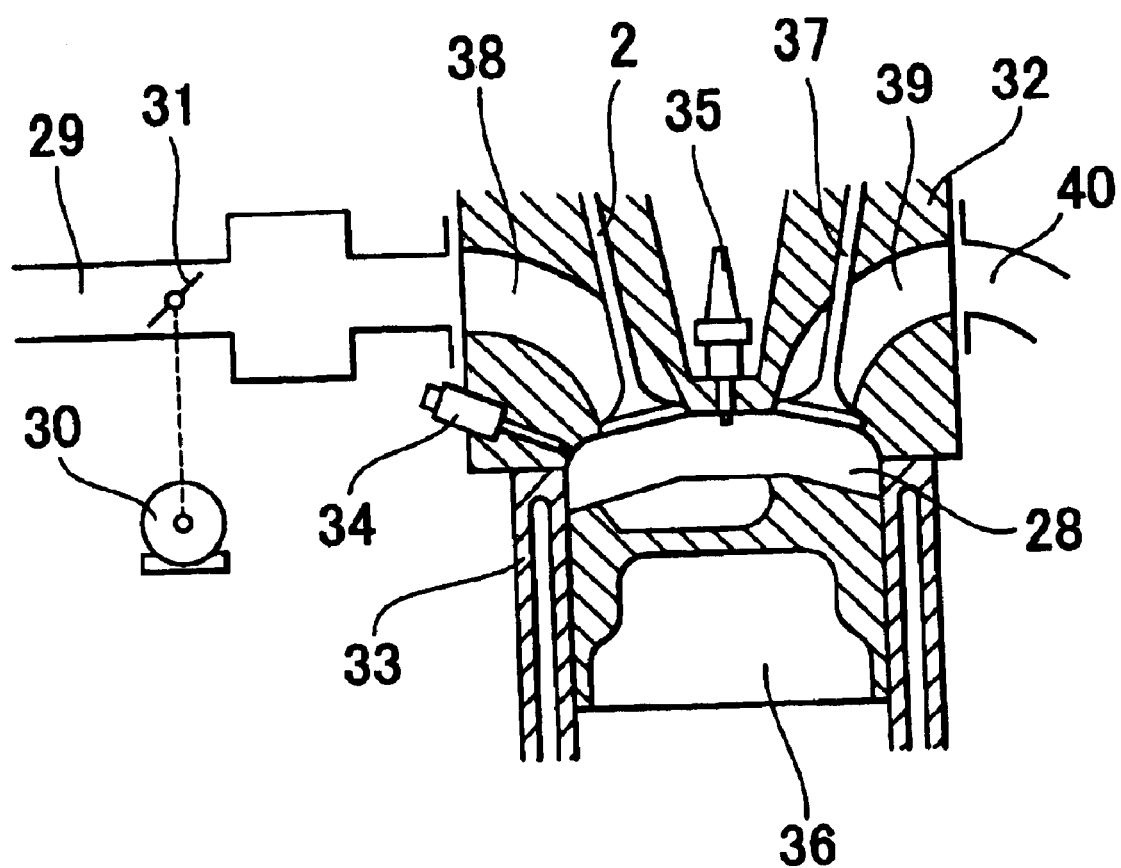
FIG. 11 is a view showing the construction of an internal combustion engine which employs control apparatus and method according to a fourth embodiment of the invention.

In order to accomplish an objective similar to those of the above-described embodiments, the invention may also be applied to an internal combustion engine as shown in FIG. 11, wherein the valve actuating system is provided with the lift amount changing mechanism and the lift timing changing mechanism 19, and a throttle valve 31 adapted to be driven by an electric stepping motor 30 is disposed in an intake passage 29 that leads to a combustion chamber 28 of the engine. The internal combustion engine of FIG. 11 includes a cylinder head 32, a cylinder block 33, a fuel injector 34, a spark plug 35, a piston 36, an exhaust valve 37, an intake port 38, an exhaust port 39 and an exhaust passage 40.

In a control method according to a fourth embodiment of the invention, target operation values of the lift amount changing mechanism, the lift timing changing mechanism 19 and the throttle valve 31 are determined in the following manner. In the fourth embodiment, target operation values of the electric motor 16 of the lift amount changing mechanism, the hydraulic pump 27 of the lift timing changing mechanism 19 and the stepping motor 30 of the throttle valve 31, which optimize the required characteristics of the internal combustion engine, are initially calculated as target operation values of the lift amount changing mechanism, the lift timing changing mechanism 19 and the throttle valve 31, which optimize the required characteristics of the engine.

Subsequently, realizable operation ranges of the electric motor 16 are calculated as realizable operation ranges of the lift amount changing mechanism, using a physical model (represented by mathematical expressions), based on the level of voltage (controlled variable) that can be applied to the electric motor 16 and the parameters related to the environment surrounding the electric motor 16. Also, realizable operation ranges of the hydraulic pump 27 are calculated as realizable operation ranges of the lift timing changing mechanism 19, using a physical model (represented by mathematical expressions), based on the driving force (controlled variable) that can be applied to the hydraulic pump 27 and the parameters related to the environment surrounding the hydraulic pump 27. Furthermore, realizable operation ranges of the stepping motor 30 are calculated as realizable operation ranges of the throttle valve 31, using a physical model (represented by mathematical expressions), based on the driving force (controlled variable) that can be applied to the stepping motor 30 and parameters related to the environment surrounding the stepping motor 30.

If the initially calculated target operation values of the electric motor 16, hydraulic pump 27 and the stepping motor 30 are within the respective realizable operation ranges, these target values are employed as they are as final target operation values of the electric motor 16, hydraulic pump 27 and the stepping motor 30. Thus, the initially calculated target values are employed as they are as final target operation values of the lift amount changing mechanism, lift timing changing mechanism 19 and the throttle valve 31.

If the initially calculated target operation values of one of the electric motor 16, hydraulic pump 27 and the stepping motor 30 are not within the realizable operation ranges, on the other hand, the target operation values of the electric motor 16 are changed so as to approach the realizable operation values, and target operation values of the hydraulic pump 27 and the stepping motor 30 are newly calculated to be within the realizable operation ranges of the hydraulic pump 27 and the stepping motor 30, based on the thus changed target operation values of the electric motor 16, so that the required characteristics of the internal combustion engine become as close to the optimum characteristics as possible, or so that the required characteristics of the engine to which priorities are assigned become as close to the optimum characteristics as possible in order of priority.

FIG. 12A through FIG. 12D show the progression of the lift amount of the intake valve 2, the lift timing of the intake valve 2, the opening angle of the throttle valve 31 (i.e., throttle opening), and the output torque of the engine, which are measured while the lift amount changing mechanism, lift timing changing mechanism 19 and the throttle valve 31 are controlled according to the fourth embodiment, in the case where the output torque of the engine is employed as a typical example of the required characteristics of the engine.

Figure 12A:
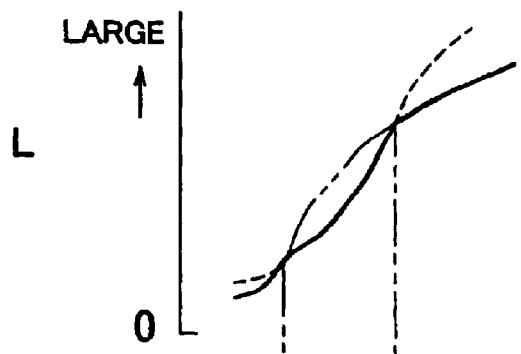
FIG. 12A through FIG. 12D are views showing one example of the progression of the lift amount, lift timing, throttle opening and the output torque over time while the lift amount, lift timing and the throttle opening are controlled according to the fourth embodiment of the invention.
Figure 12B:
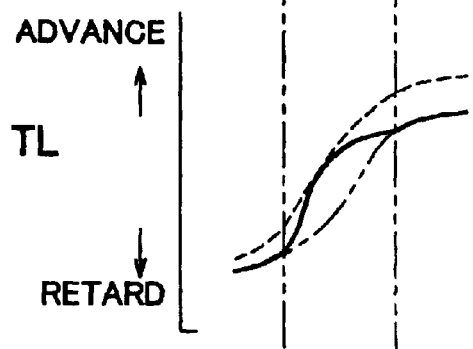
Figure 12C:
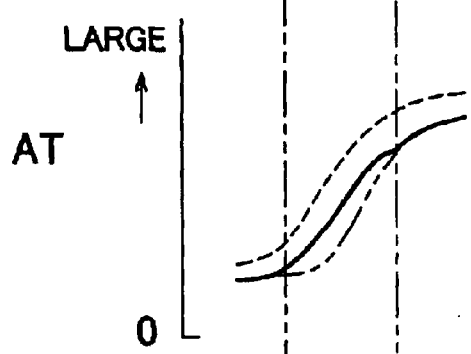
Figure 12D:
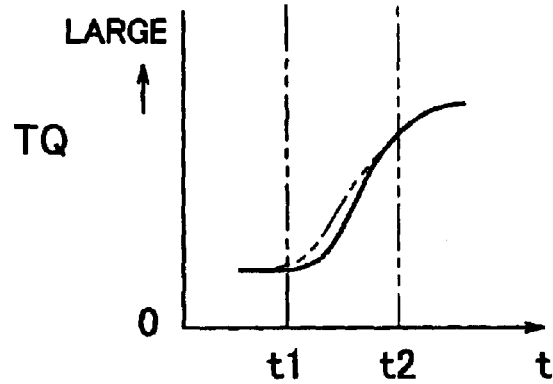

More specifically, FIG. 12A indicates the lift amount L of the intake valve 2, FIG. 12B indicates the lift timing TL of the intake valve 2, FIG. 12C indicates the opening angle AT of the throttle valve 31, and FIG. 12D indicates the output torque TQ of the engine. In FIG. 12A, the one-dot chain line indicates the progression of the target value of the lift amount L with which the required torque can be achieved, and the broken line indicates the progression of the lift amount L that can be realized by the lift amount changing mechanism. In FIG. 12B, the one-dot chain line indicates the progression of the target value of the lift timing TL with which the required torque can be achieved, and the broken line indicates the progression of the lift timing TL that can be achieved by the lift timing changing mechanism 19. In FIG. 12C, the one-dot chain line indicates the progression of the target value of the throttle opening AT, and the broken line indicates the progression of the opening angle AT that can be achieved by the throttle valve 31. In FIG. 12D, the one-dot chain line indicates the progression of the required torque TQ. In FIG. 12B, "ADVANCE" means advance of the lift timing TL, and "RETARD" means retard of the lift timing TL. In FIGS. 12A–12D, the horizontal axis indicates time t.

In the example of FIG. 12A through FIG. 12D, up to time t1, the target value (on the one-dot chain line in FIG. 12A) of the lift amount L that achieves the required torque, the target value (on the one-dot chain line in FIG. 12B) of the lift timing TL that achieves the required torque, and the target value (on the one-dot chain line in FIG. 12C) of the throttle opening AT that achieves the required torque are within the realizable operation ranges (defined by the broken lines) of the lift amount changing mechanism, lift timing changing mechanism 19 and the throttle valve 31, respectively. Accordingly, up to time t1, the target values on the one-dot chain lines are employed as they are as final target values of the lift amount L, lift timing TL and the throttle opening AT. Namely, up to time t1, the lift amount L, lift timing TL and the throttle opening AT vary along the one-dot chain lines, as indicated by the solid lines in FIGS. 12A, 12B and 12C, and the output torque TQ of the engine also varies along the one-dot chain line, as indicated by the solid line in FIG. 12D.

Between time t1 and time t2 in the example of FIG. 12A through FIG. 12D, on the other hand, the target value (on the one-dot chain line in FIG. 12A) of the lift amount L that achieves the required torque is not within the realizable operation range (defined by the broken line) of the lift amount changing mechanism, and the target value (on the one-dot chain line in FIG. 12B) of the lift timing TL and the target value (on the one-dot chain line in FIG. 12C) of the throttle opening AT, which values achieve the required torque, are within the respective realizable operation ranges (defined by the broken lines) of the lift timing changing mechanism 19 and the throttle valve 31. Accordingly, between time t1 and time t2, the realizable lift amount L of the lift amount changing mechanism on the broken line is employed as a new target value, and target values of the lift timing TL and the throttle opening AT are newly calculated to be within the realizable operation ranges (defined by the broken lines) of the lift timing changing mechanism 19 and the throttle valve 31, based on the new target value of the lift amount L, so that the output torque TQ of the engine becomes as close to the required torque as possible. Namely, between t1 and t2, the lift amount L varies along the broken line representing the realizable operation value of the lift amount changing mechanism, as indicated by the solid line in FIG. 12A, and the lift timing TL and the throttle opening AT vary so as to approach the broken lines representing the realizable operation values of the lift timing changing mechanism 19 and the throttle valve 31, as indicated by the solid lines in FIGS. 12B and 12C, while the output torque TQ of the engine varies in the neighborhood of the one-dot chain line that represents the required torque, as indicated by the solid line in FIG. 12D.

After time t2 in the example of FIG. 12A through FIG. 12D, the target value (on the one-dot chain line in FIG. 12A) of the lift amount L that achieves the required torque, the target value (on the one-dot chain line in FIG. 12B) of the lift timing TL that achieves the required torque, and the target value (on the one-dot chain line in FIG. 12C) of the throttle opening AT that achieves the required torque are within the realizable operation ranges (defined by the broken lines in FIGS. 12A, 12B and 12C) of the lift amount changing mechanism, lift timing changing mechanism 19 and the throttle valve 31, respectively. Accordingly, after time t2, the target values on the one-dot chain lines are employed as they are as final target values of the lift amount L, lift timing TL and the throttle opening AT. Namely, after time t2, the lift amount L, lift timing TL and the throttle opening AT vary along the one-dot chain lines, as indicated by the solid lines in FIGS. 12A, 12B and 12C, respectively, and the output torque TQ of the engine also varies along the one-dot chain line, as indicated by the solid line in FIG. 12D.

It is to be understood that the invention is equally applicable to a valve actuating system for lifting exhaust valves of the internal combustion engine, which system is provided with a lift amount changing mechanism for changing the lift amount of the exhaust valves, and/or a lift timing changing mechanism for changing the lift timing of the exhaust valves.

While the realizable operation ranges of the lift amount changing mechanism (electric motor) or the lift timing changing mechanism (hydraulic pump) are calculated by using a physical model (represented by mathematical expressions) in the illustrated embodiments, the invention is not limited to this arrangement. For example, the realizable operation ranges of each of the lift amount changing mechanism and the lift timing changing mechanism may be obtained in the form of maps, in relation to the controlled variable that can be given to the lift amount changing mechanism or the lift timing changing mechanism and the parameters related to the environment surrounding the mechanism in question, and the thus obtained maps may be stored in a computer connected to the engine. When each of the lift amount and lift timing changing mechanisms is to be controlled, the realizable operation ranges of the mechanism may be obtained from the above maps, based on the controlled variable that can be given to the mechanism in question and the parameters related to the environment surrounding the mechanism.

What is claimed is:

1. A control apparatus for a valve actuating system which is operable to lift an intake valve or an exhaust valve of an internal combustion engine and includes a lift characteristic changing mechanism for changing a lift characteristic of the intake valve or the exhaust valve, comprising a controller that:

calculates a target operation value of the lift characteristic changing mechanism;

calculates a realizable range of the operation value which can be realized by the lift characteristic changing mechanism, based on a controlled variable that can be given to the lift characteristic changing mechanism and at least one parameter related to an environment surrounding the lift characteristic changing mechanism; and calculates a new target operation value of the lift characteristic changing mechanism to be within the realizable range of the operation value when the target operation value is not within the realizable range of the operation value.

2. The control apparatus according to claim 1, wherein the lift characteristic changing mechanism comprises a mechanism that is operable to change a lift amount of the intake valve.

3. The control apparatus according to claim 1, wherein the lift characteristic changing mechanism comprises a mechanism that is operable to change a phase of a lift stroke of the intake valve relative to a piston stroke of the internal combustion engine.

4. The control apparatus according to claim 1, wherein the controller stores a physical model that is usable for calculating a range of the operation value of the lift characteristic changing mechanism, based on the controlled variable that can be given to the lift characteristic changing mechanism and said at least one parameter related to the environment surrounding the lift characteristic changing mechanism; and the controller calculates the realizable range of the operation value of the lift characteristic changing mechanism, based on the physical model.

5. The control apparatus according to claim 1, wherein:
the lift characteristic changing mechanism comprises an actuator that is driven by electric power; and
the at least one parameter comprises at least one selected from a temperature of the actuator, an operating position of the actuator, an operating velocity of the actuator, an operating acceleration of the actuator, and an engine speed.

6. The control apparatus according to claim 1, wherein:
the lift characteristic changing mechanism comprises an actuator that is driven by a pressure of oil delivered from a hydraulic pump; and
the at least one parameter comprises at least one selected from a hydraulic pressure, an oil temperature, operating characteristics of the hydraulic pump, and an engine speed.

7. A control apparatus for a valve actuating system which is operable to lift an intake valve or an exhaust valve of an internal combustion engine, and includes a first lift characteristic changing mechanism for changing a first lift characteristic of the intake valve or the exhaust valve and a second lift characteristic changing mechanism for changing a second lift characteristic of the intake valve or the exhaust valve, comprising a controller that:

calculates a target operation value of each of the first and second lift characteristic changing mechanisms;

calculates a realizable range of the operation value that can be realized by each of the first and second lift characteristic changing mechanisms, based on at least one condition related to an operation of said each lift characteristic changing mechanism; and calculates a new target operation value to be within the realizable range of the operation value when the target operation value is not within the realizable range of the operation value.

8. The control apparatus according to claim 7, wherein when the target operation value of one of the first lift characteristic changing mechanism and the second lift characteristic changing mechanism is not within the realizable range of the operation value, the controller calculates a new target operation value of the one of the first and second lift characteristic changing mechanisms to be within the realizable range of the operation value, and calculates a new target operation value of the other of the first and second lift characteristic changing mechanisms, based on the new target operation value of the one of the first and second lift characteristic changing mechanisms.

9. The control apparatus according to claim 7, wherein the first lift characteristic changing mechanism comprises a mechanism that is operable to change a lift amount of the intake valve, and the second lift characteristic changing mechanism comprises a mechanism that is operable to change a phase of a lift stroke of the intake valve relative to a piston stroke of the internal combustion engine.

10. The control apparatus according to claim 7, wherein said at least one condition comprises a controlled variable that can be given to said each lift characteristic changing mechanism, and at least one parameter related to an environment surrounding said each lift characteristic changing mechanism.

11. The control apparatus according to claim 10, wherein:
the controller stores a physical model that is usable for calculating a range of the operation value of each of the first and second lift characteristic changing mechanisms, based on the controlled variable that can be given to said each lift characteristic changing mechanism and said at least one parameter related to the environment surrounding said each lift characteristic changing mechanism; and the controller calculates the realizable range of the operation value of said each lift characteristic changing mechanism, based on the physical model.

12. A method of controlling a valve actuating system which is operable to lift an intake valve or an exhaust valve of an internal combustion engine and includes a lift characteristic changing mechanism for changing a lift characteristic of the intake valve or the exhaust valve, comprising the steps of:

calculating a target operation value of the lift characteristic changing mechanism;

calculating a realizable range of the operation value which can be realized by the lift characteristic changing mechanism, based on a controlled variable that can be given to the lift characteristic changing mechanism and at least one parameter related to an environment surrounding the lift characteristic changing mechanism; and calculating a new target operation value of the lift characteristic changing mechanism to be within the realizable range of the operation value when the target operation value is not within the realizable range of the operation value.

13. A method of controlling a valve actuating system which is operable to lift an intake valve or an exhaust valve of an internal combustion engine, and includes a first lift characteristic changing mechanism for changing a first lift characteristic of the intake valve or the exhaust valve and a second lift characteristic changing mechanism for changing a second lift characteristic of the intake valve or the exhaust valve, comprising the steps of:

calculating a target operation value of each of the first and second lift characteristic changing mechanisms; calculating a realizable range of the operation value that can be realized by each of the first and second lift characteristic changing mechanisms, based on at least one condition related to an operation of said each lift characteristic changing mechanism; and calculating a new target operation value to be within the realizable range of the operation value when the target operation value is not within the realizable range of the operation value.

14. The method according to claim 13, wherein when the target operation value of one of the first lift characteristic changing mechanism and the second lift characteristic changing mechanism is not within the realizable range of the operation value, a new target operation value of the one of the first and second lift characteristic changing mechanisms is calculated to be within the realizable range of the operation value, and a new target operation value of the other of the first and second lift characteristic changing mechanisms is calculated, based on the new target operation value of the one of the first and second lift characteristic changing mechanisms.

* * * * *